United States Patent
Wu et al.

(10) Patent No.: US 11,397,535 B2
(45) Date of Patent: *Jul. 26, 2022

(54) ONE-TIME PROGRAMMABLE MEMORY DEVICE AND FAULT TOLERANCE METHOD THEREOF

(71) Applicant: Nuvoton Technology Corporation, Hsinchu Science Park (TW)

(72) Inventors: Kun-Yi Wu, Tainan (TW); Yu-Shan Li, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,162

(22) Filed: Sep. 8, 2020

(65) Prior Publication Data

US 2021/0200440 A1    Jul. 1, 2021

(30) Foreign Application Priority Data

Dec. 25, 2019    (TW) ................. 108147502

(51) Int. Cl.
*G06F 3/06*    (2006.01)

(52) U.S. Cl.
CPC ............ *G06F 3/064* (2013.01); *G06F 3/0604* (2013.01); *G06F 3/0631* (2013.01);
(Continued)

(58) Field of Classification Search
CPC ...... G06F 3/064; G06F 3/0631; G06F 3/0688; G06F 3/0653; G06F 3/0604;
(Continued)

(56) References Cited

U.S. PATENT DOCUMENTS

| 7,319,610 B2 | 1/2008 | Kuo |
| 2003/0217322 A1 | 11/2003 | Rodgers |

(Continued)

FOREIGN PATENT DOCUMENTS

| TW | 201044407 A | 12/2010 |
| TW | 201706856 A | 2/2017 |

*Primary Examiner* — Masud K Khan
(74) *Attorney, Agent, or Firm* — Muncy, Geissler, Olds & Lowe, P.C.

(57) ABSTRACT

A one-time programmable memory device is provided in the invention. The one-time programmable memory device includes a one-time programmable memory and a memory controller. The one-time programmable memory includes a first block and a second block. The first block includes a plurality of initial address units and each initial address unit corresponds to a variable to record the storage address of its corresponding variable, and wherein the second block includes a plurality of storage units and each storage unit has a corresponding storage address. The memory controller is coupled to the one-time programmable memory. The memory controller allocates the storage address to the variable. The content of each variable is stored in the storage unit corresponding to the storage address corresponding to the variable. The number of initial address units is smaller than the number of storage units.

18 Claims, 6 Drawing Sheets

(52) U.S. Cl.
CPC .......... *G06F 3/0653* (2013.01); *G06F 3/0659* (2013.01); *G06F 3/0688* (2013.01)

(58) Field of Classification Search
CPC .. G06F 3/0659; G06F 8/654; G06F 2015/766; G06F 2206/1014
See application file for complete search history.

(56) References Cited

U.S. PATENT DOCUMENTS

| | | |
|---|---|---|
| 2006/0206672 A1 | 9/2006 | Bushner |
| 2010/0177547 A1 | 7/2010 | Shen |
| 2012/0124279 A1 | 5/2012 | Pekny |
| 2012/0206971 A1 | 8/2012 | Chi |
| 2012/0280711 A1* | 11/2012 | Landry ................ G11C 8/16 326/41 |
| 2014/0071726 A1 | 3/2014 | Chung |
| 2015/0294196 A1* | 10/2015 | Toyoda ............ G06F 11/1441 358/1.16 |
| 2016/0232044 A1 | 8/2016 | Doyle et al. |
| 2018/0024830 A1* | 1/2018 | Kannan ................ G06F 8/654 711/104 |
| 2019/0317778 A1* | 10/2019 | Chen ................ G06F 9/4418 |
| 2020/0319876 A1* | 10/2020 | Colombo ............. G06F 12/10 |
| 2021/0182219 A1 | 6/2021 | Benisty |

\* cited by examiner

ONE-TIME PROGRAMMABLE MEMORY DEVICE AND FAULT TOLERANCE METHOD THEREOF

CROSS REFERENCE TO RELATED APPLICATIONS

This application claims priority of TW Patent Application No. 108147502 filed on Dec. 25, 2019, the entirety of which is incorporated by reference herein.

BACKGROUND OF THE INVENTION

Field of the Invention

The invention generally relates to a one-time programmable memory technology, and more particularly, to the one-time programmable memory in which the initial address units are configured.

Description of the Related Art

The one-time programmable memory is a general data storage space. Its property is that the memory only tolerates one-time programming and the programmed data cannot be erased or changed. When the user wants to modify the data, the irreversibility of the one-time programmable memory for the data programming will be a trouble for the user. Therefore, a fault tolerance mechanism is introduced into the one-time programmable memory to provide the function of modifying the contents of variables in the programmed data.

For the fault tolerance mechanism, the simple realized method is the fault tolerance mechanism based on the version. In the fault tolerance mechanism based on the version, a plurality of spaces with the same size will be allocated according to the limitation of the times of the modifying the data. Each space can be regarded as a version, and is assigned a specific version number. In the fault tolerance mechanism based on the version, a variable "executed version number" is provided to tell the controller which version number is used currently. When the user wants to modify the contents of the variables, the new contents of the variables will be programmed into the new version, and the executed version number will be changed to the version number of new version. However, in the fault tolerance mechanism based on the version, when a variable needs to be modified, the storage space of the original version in which other accurate variables are stored will be abandoned. For example, when the content of a variable in version 1 needs to be modified, the contents of all variables in version 1 will need to be programmed into the storage space of new version (e.g. version 2), and the storage space of the version 1 will be abandoned. Therefore, although the fault tolerance mechanism based on the version is simple and realized easily, a lot of storage spaces are wasted.

BRIEF SUMMARY OF THE INVENTION

A one-time programmable memory device and a tolerance method for the one-time programmable memory are provided to overcome the problems described above.

An embodiment of the invention provides a one-time programmable memory device. The one-time programmable memory device comprises a one-time programmable memory and a memory controller. The one-time programmable memory comprises a first block and a second block. The first block comprises a plurality of initial address units and each initial address unit corresponds to a variable to record the storage address of its corresponding variable, and wherein the second block comprises a plurality of storage units and each storage unit has a corresponding storage address. The memory controller is coupled to the one-time programmable memory. The memory controller allocates the storage address to the variable. The content of each variable is stored in the storage unit corresponding to the storage address corresponding to the variable. The number of initial address units is smaller than the number of storage units.

In some embodiments, the one-time programmable memory device further comprises a third block and a fourth block. The third block is configured to record the number of variables which have been programmed into the one-time programmable memory. The fourth block is configured to record the number of storage units.

In some embodiments, the contents stored in the first block, the third block and the fourth block are generated through a one-hot encoding method.

In some embodiments, when a new variable needs to be added into the one-time programmable memory, the memory controller determines that the number of variables which have been programmed into the one-time programmable memory has reached an upper limit value. If the number of variables which have been programmed into the one-time programmable memory have not reached the upper limit value, the memory controller sets a variable name for the new variable according to the number of variables which have been programmed into the one-time programmable memory.

In some embodiments, when one of the variables needs to be modified, the memory controller determines whether the number of storage units which have been used has reached an upper limit value. If the number of storage units which have been used have not reached the upper limit value, the memory controller assigns the storage address which has not been used in the second block to the variable which needs to be modified. When the variable is modified, the memory controller increases the number of storage units which have been used by 1.

In some embodiments, when the content of the variable programmed into the one-time programmable memory needs to be read, the memory controller reads the storage address stored in the initial address unit corresponding to the variable whose content needs to be read, and then obtains the content of the variable according to the storage address.

In some embodiments, each initial address unit further records the variable number and the variable name of its corresponding variable.

An embodiment of the invention provides a tolerance method for the one-time programmable memory. The tolerance method for the one-time programmable memory comprises the steps of configuring a first block and a second block in a one-time programmable memory of a one-time programmable memory device, wherein the first block comprises a plurality of initial address units and each initial address unit corresponds to a variable to record the storage address of its corresponding variable, and wherein the second block comprises a plurality of storage units and each storage unit has a corresponding storage address; and allocating, via a memory controller of the one-time programmable memory device, the storage address to the variable. The content of each variable is stored in the storage unit corresponding to the storage address corresponding to the variable. The number of initial address units is smaller than the number of storage units.

Other aspects and features of the invention will become apparent to those with ordinary skill in the art upon review of the following descriptions of specific embodiments of the one-time programmable memory device and the tolerance method for the one-time programmable memory.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
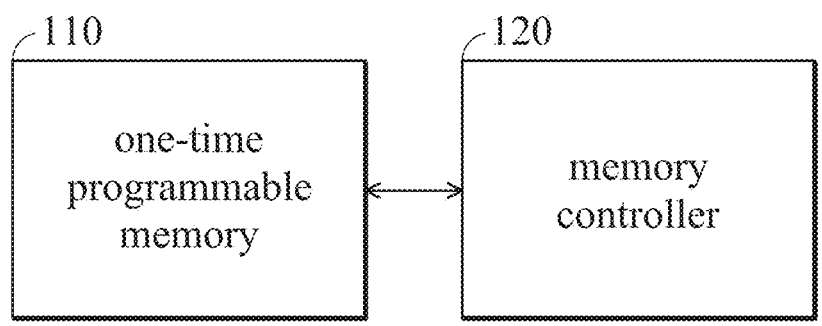
FIG. 1 is a schematic diagram of a one-time programmable memory device 100 according to an embodiment of the invention.

FIG. 1 is a schematic diagram of a one-time programmable memory device 100 according to an embodiment of the invention. As shown in FIG. 1, the one-time programmable memory device 100 may comprise a one-time programmable memory 110 and a memory controller 120. It should be noted that in order to clarify the concept of the invention, FIG. 1 presents a simplified block diagram in which only the elements relevant to the invention are shown. However, the invention should not be limited to what is shown in FIG. 1. The one-time programmable memory device 100 may comprise other elements.

According to an embodiment of the invention, a processor (not shown in figures) may transmit commands to the memory controller 120 through a bus (e.g. an advanced high-performance bus), and then, the memory controller 120 may perform the corresponding operations to the one-time programmable memory 110 according to the commands. In addition, according to an embodiment of the invention, the variables can be burned (programmed) into the one-time programmable memory 110 through a burning tool or burning software.

Figure 2:
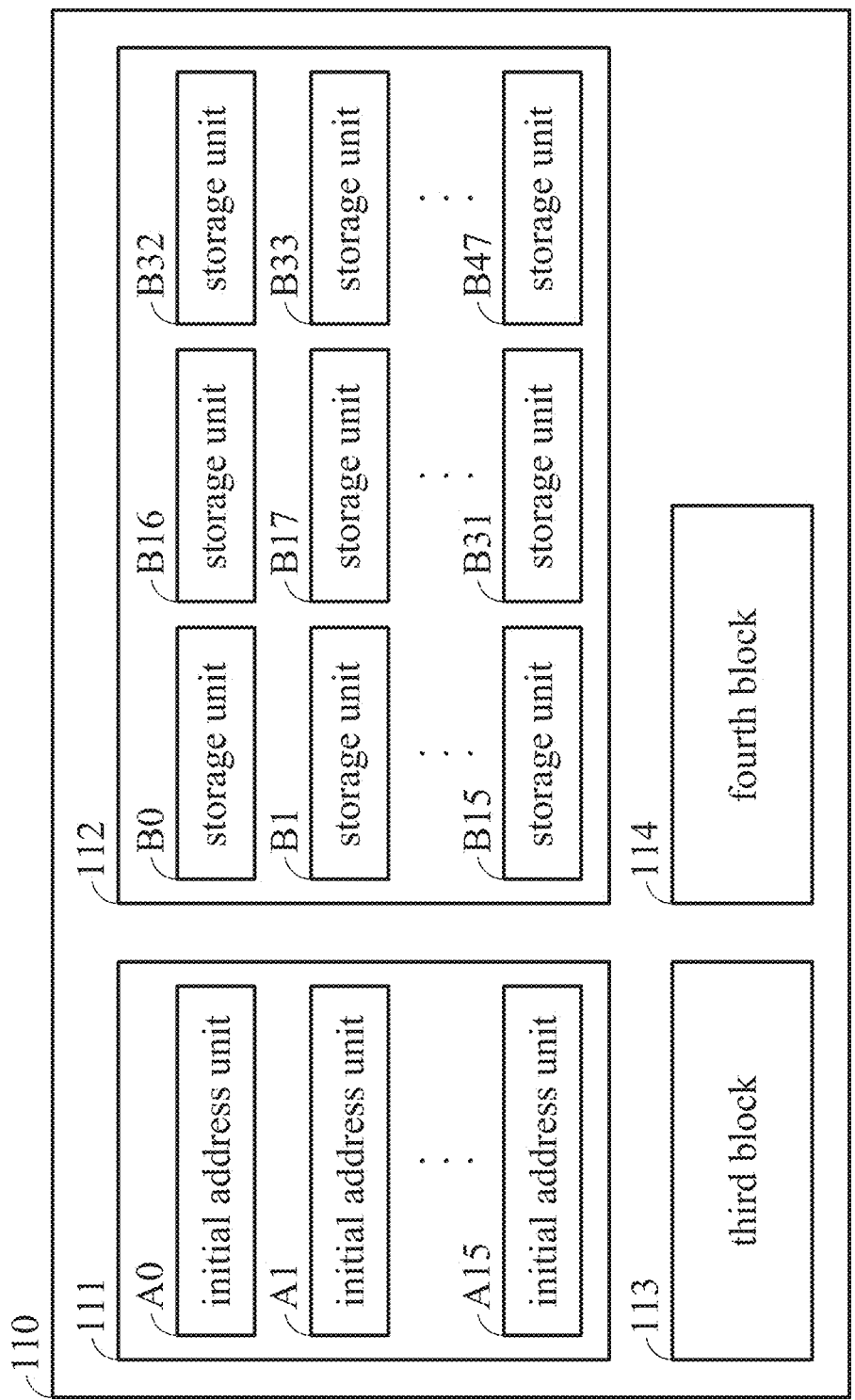
FIG. 2 is a schematic diagram of a one-time programmable memory 110 according to an embodiment of the invention.

FIG. 2 is a schematic diagram of a one-time programmable memory 110 according to an embodiment of the invention. As shown in FIG. 2, the one-time programmable memory 110 may comprise a first block 111, a second block 112, a third block 113 and fourth block 114. It should be noted that in order to clarify the concept of the invention, FIG. 2 presents a simplified block diagram in which only the elements relevant to the invention are shown. However, the invention should not be limited to what is shown in FIG. 2.

According to an embodiment of the invention, the contents stored in the first block 111, the third block 113 and the fourth block 114 are encoded through a One-Hot Encoding method.

As shown in FIG. 2, the first block 111 of the one-time programmable memory 110 may comprise the 16 initial address units A0~A15 (i.e. it means that there are 16 variables can be programmed into the one-time programmable memory 110), and each initial address unit may occupy 64 bits, but the invention should not be limited thereto. The second block 112 of the one-time programmable memory 110 may comprise 48 storage units B0~B47 (i.e. it means that there are 48 storage addresses can be assigned), and each storage unit may occupy 64 bits, but the invention should not be limited thereto. The third block 113 of the one-time programmable memory 110 may occupy 16 bits, but the invention should not be limited thereto. The fourth block 114 of the one-time programmable memory 110 may occupy 48 bits, but the invention should not be limited thereto.

According to an embodiment of the invention, the first block 111 may comprise a plurality of initial address units. When a new variable is programmed into the one-time programmable memory 110, the memory controller 120 may assign an initial address unit to the variable which needs to be programmed into the one-time programmable memory 110. That is to say, each initial address unit may correspond to a variable. In the embodiment of the invention, each initial address unit may record the storage address of its corresponding variable. According to an embodiment of the invention, when the variables are programmed into the one-time programmable memory 110, the memory controller 120 may assign a variable number to each variable sequentially. Each initial address unit may also record the variable numbers and variable names of all variables. Table 1-1 and Table 2-1 are used to illustrate below.

According to an embodiment of the invention, the second block 112 may comprise a plurality of storage units. Each storage unit may have a corresponding storage address. Each storage address may have a storage address number (e.g. as shown in Table 1.1, Table 2.1 and Table 3.1). When a new variable is programmed into the one-time programmable memory 110, the memory controller 120 may assign a storage address to the variable programmed into the one-time programmable memory 110. The content of the variable programmed into the one-time programmable memory 110 may store in the storage unit corresponding to the corresponding storage address of the variable, and each initial address unit may record the storage address corresponding to its corresponding variable. As shown in FIG. 2, in the embodiment of the invention, the number of variables which can be programmed into the one-time programmable memory 110 is smaller than the number of storage units (i.e. the number of storage addresses). In addition, as shown in FIG. 2, according to an embodiment of the invention, the size of an initial address unit is the same as the size of a storage unit.

In the embodiments of the invention, when the content of the variable needs to be modified, the memory controller 120 may assign a new storage address to the variable, and the storage unit storing the content of the variable originally will be abandoned and no longer used.

According to an embodiment of the invention, the third block 113 is configured to record the number of variables which have been programmed into the one-time programmable memory 110 (the number is expressed as MAX_USED_NO below). The initial value of the MAX_USED_NO is set to 0 (after encoding, the content of the initial value may be 16'h0000). After a new variable is programmed into the one-time programmable memory 110, the value of MAX_USED_NO will increase by 1. In the embodiments of the invention, the upper limit value of the number of variables which can be programmed into the one-time programmable memory 110 (i.e. the upper limit value of the MAX_USED_NO) is defined in the third block 113 in advance. When the value of the MAX_USED_NO has reached the upper limit value, no longer can a new variable be programmed into the one-time programmable memory 110. That is to say, when a new variable needs to be programmed into the one-time programmable memory 110, the memory controller 120 may determine whether the value of MAX_USED_NO has reached the upper limit value first. If the value of MAX_USED_NO has reached the upper limit value, the memory controller 120 will not establish a new variable in the one-time programmable memory 110. In addition, if the value of MAX_USED_NO has reached the upper limit value, a variable which is indicated to be modified is not one of the variables which have been programmed into the one-time programmable memory 110, and the memory controller 120 may indicate the variable to be an invalid variable. Details of block 113 are illustrated in FIG. 2, Table 1-2, and Table 2-2.

According to an embodiment of the invention, the fourth block 114 is configured to record the number of storage addresses which have been used (the number is expressed as MAX_USED_ADDR below). The initial value of MAX_USED_ADDR is set to 0 (after encoding, the content of the initial value may be 48'h0000_0000_0000). When the memory controller 120 assigns a storage address to a variable, the value of MAX_USED_ADDR will be increased by 1. In the embodiments of the invention, the upper limit value of the number of storage addresses (i.e. the upper limit value of MAX_USED_ADDR) is defined in the block 114 in advance. When the value of MAX_USED_ADDR has reached the upper limit value (i.e. all storage units have been used), the memory controller 120 will not assign the storage address to the variable. Details of block 113 are illustrated in FIG. 2, Table 1-3, and Table 2-3.

TABLE 1-1

| Variable Number | Variable Name | Storage Address | Number of Storage Address |
|---|---|---|---|
| 0 | Setting 0 | 64'h0000_0000_0000_0000 | 0 |

TABLE 1-2

| | Upper limit value of the number of variables | Encoded content | the number of programmed variable (i.e. MAX_USED_NO) |
|---|---|---|---|
| Third Block | 16 | 16'h0001 | 1 |

TABLE 1-3

| | Upper limit value of the number of storage addresses | Encoded content | the number of used storage units (i.e. MAX_USED_ADDR) |
|---|---|---|---|
| Fourth Block | 48 | 48'h000_0000_0001 | 1 |

According to an embodiment of the invention, Table 1-1~Table 1-3 respectively shows the information recorded in first block 111, third block 113 and fourth block 114 when the first variable is programmed into the one-time programmable memory 110. It should be noted that Table 1-1~Table 1-3 are only used to illustrate the embodiments of the invention, but the invention should not be limited thereto. Referring to FIG. 2 and Table 1-1, when the first variable Setting 0 is programmed into the one-time programmable memory 110, the memory controller 120 may assign a variable number 0 to the first variable Setting 0 according to the initial value (i.e. the initial value of MAX_USED_NO is 0, and the encoded content of the initial value may be 16'h0000) stored in the third block 113. In addition, the memory controller 120 may assign a storage address 64'h0000_0000_0000_0000 to the first variable Setting 0 according to the initial value stored in the fourth block 114 (i.e. the initial value of MAX_USED_ADDR is 0, and the encoded content of the initial value may be 48'h0000_0000_0000), and the initial address unit A0 of the first block 111 may record the storage address 64'h0000_0000_0000_0000 corresponding to the first variable Setting 0, wherein the storage address 64'h0000_0000_0000_0000 corresponds to a storage address number 0. The content corresponding to the first variable Setting 0 may be stored in the storage unit B0 corresponding to the storage address 64'h0000_0000_0000_0000. Then, referring to FIG. 2 and Table 1-2, after the first variable Setting 0 is programmed into the one-time programmable memory 110, the value stored in the third block 113 may be increased by 1 (i.e. the value of MAX_USED_NO is changed to 1, and the encoded content of the value may be 16'h0001). In the embodiment, the memory controller 120 may set the variable number of next variable Setting 1 according to the value stored in the third block 113 shown in Table 1-2. In addition, referring to FIG. 2 and Table 1-3, after the first variable Setting 0 is programmed into the one-time programmable memory 110, the value stored in the fourth block 114 may be increased by 1 (i.e. the value of MAX_USED_ADDR is changed to 1, and the encoded content of the value may be 48'h0001_0000_0001). In the embodiment, the memory controller 120 may assign a storage address to the next variable Setting 1 according to the value stored in the fourth block 114 shown in Table 1-3.

TABLE 2-1

| Variable Number | Variable Name | Storage Address | Number corresponding to the Storage Address |
|---|---|---|---|
| 0 | Setting_0 | 64'h0000_0000_0000_0000 | 0 |
| 1 | Setting_1 | 64'h0000_0000_0000_0001 | 1 |
| 2 | Setting_2 | 64'h0000_0000_0000_0003 | 2 |
| 3 | Setting_3 | 64'h0000_0000_0000_0007 | 3 |
| 4 | Setting_4 | 64'h0000_0000_0000_000F | 4 |
| 5 | Setting_5 | 64'h0000_0000_0000_001F | 5 |
| . | . | . | . |
| . | . | . | . |
| . | . | . | . |
| 15 | Setting_15 | 64'h0000_0000_0000_7FFF | 15 |

TABLE 2-2

| | Upper limit value of the number of variables | Encoded content | the number of programmed variable (i.e. MAX_USED_NO) |
|---|---|---|---|
| Third Block | 16 | 16'hFFFF | 16 |

TABLE 2-3

| | Upper limit value of the number of storage addresses | Encoded content | the number of used storage units (i.e. MAX_USED_ADDR) |
|---|---|---|---|
| Fourth Block | 48 | 48'h000_0000_FFFF | 16 |

According to an embodiment of the invention, Table 2-1~Table 2-3 respectively shows the information recorded in first block 111, third block 113 and fourth block 114 when all variables are programmed into the one-time programmable memory 110. It should be noted that Table 2-1~Table 2-3 are only used to illustrate the embodiments of the invention, but the invention should not be limited thereto. Referring to FIG. 2 and Table 2-1, after the variables Setting 0~Setting 15 are programmed into the one-time programmable memory 110, the initial address units A0~A15 may respective record the storage addresses corresponding to the variables Setting 0~Setting 15, wherein the storage addresses corresponding to the variables Setting 0~Setting 15 may respectively corresponds to storage number 0-15. The contents corresponding to the variables Setting 0~Setting 15 may be respectively stored in the storage units B0~B15. Then, referring to FIG. 2 and Table 2-2, after the variables Setting 0~Setting 15 are programmed into the one-time programmable memory 110, the value stored in the third block 113 is 16 (i.e. the value of MAX_USED_NO is 16 and the encoded content of the value may be 16'hFFFF). Because the value stored in the third block 113 has reached the upper limit value, the memory controller cannot establish a new variable in the one-time programmable memory 110. In addition, referring to FIG. 2 and Table 2-3, after the variables Setting 0~Setting 15 are programmed into the one-time programmable memory 110, the value stored in the fourth block 114 is 16 (i.e. the value of MAX_USED_ADDR is 16, and the encoded content of the value may be 48'h0000_0000_FFFF). It means that there are 32 storage addresses remaining in the fourth block 114 to provide memory controller 120 to assign. When the content of one of the variables Setting 0~Setting 15 needs to be modified, the memory controller 120 may assign a storage address which has not been used to the variable whose content needs to be modified according to the value stored in fourth block 114 shown in Table 2-3. Details for how to modify the content of variable are illustrated through Table 3-1~Table 3-3.

TABLE 3-1

| Variable Number | Variable Name | Storage Address | Number corresponding to the Storage Address |
|---|---|---|---|
| 0 | Setting_0 | 64'h0000_0000_0000_0000 | 0 |
| 1 | Setting_1 | 64'h0000_0000_0000_FFFF | 16 |
| 2 | Setting_2 | 64'h0000_0000_0000_0003 | 2 |
| 3 | Setting_3 | 64'h0000_0000_0000_0007 | 3 |
| 4 | Setting_4 | 64'h0000_0000_0000_000F | 4 |
| 5 | Setting_5 | 64'h0000_0000_0000_001F | 5 |
| . | . | . | . |
| . | . | . | . |
| . | . | . | . |
| 15 | Setting_15 | 64'h0000_0000_0000_7FFF | 15 |

TABLE 3-2

| | Upper limit value of the number of variables | Encoded content | the number of programmed variable (i.e. MAX_USED_NO) |
|---|---|---|---|
| Third Block | 16 | 16'hFFFF | 16 |

TABLE 3-3

| | Upper limit value of the number of storage addresses | Encoded content | the number of used storage units (i.e. MAX_USED_ADDR) |
|---|---|---|---|
| Fourth Block | 48 | 48'h000_0001_FFFF | 17 |

According to an embodiment of the invention, Table 3-1~Table 3-3 respectively shows the information recorded in first block 111, third block 113 and fourth block 114 when the content of a variable needs to be modified. It should be noted that Table 3-1~Table 3-3 are only used to illustrate the embodiments of the invention, but the invention should not be limited thereto. Referring to FIG. 2 and Table 3-1, when the content of the variable Setting 1 needs to be modified, the memory controller 120 may assign a new storage address to the variable Setting 1 according to the value stored in the fourth block 114 as shown in Table 2-3. The initial address unit A1 of the first block 111 may record the new storage address 64'h0000_0000_0000_FFFF corresponding to the variable Setting 1. The modified content of variable Setting 1 may be stored in the storage unit B16 corresponding to the storage address 64'h0000_0000_0000_FFFF. In addition, the storage unit B1 assigned to the variable Setting 1 originally will be abandoned. Then, referring to FIG. 2 and Table 3-2, because the value stored in the third block 113 has reached the upper limit value, the content of Table 3-2 is the same as the content of Table 2-2. In addition, referring to FIG. 2 and Table 3-3, after the content of the variable Setting 1 has been modified, the value stored in the fourth block may be increased by 1 (i.e. the value of MAX_USED_ADDR is 17, and the encoded content of the value may be 48'h0000_0001_FFFF). When the content of another variable needs to be modified next time, the memory controller 120 may assign a new storage address to the variable whose content needs to be modified according to the value stored in the fourth block 114 as shown in Table 3-3.

According to an embodiment of the invention, when the content of the variable needs to be read, according to the variable number of variable which needs to be read, the memory controller 120 may read the storage address recoded by the initial address unit corresponding to the variable first. Then, the memory controller 120 may read the content corresponding to the variable from the storage unit corresponding to the storage address. For example, referring to FIG. 2 and Table 2-1, when the memory controller 120 knows that the content of the variable Setting 1 needs to be read according to the variable number (e.g. variable number 1) indicated in a read command, the memory controller 120 may read the storage address 64'h0000_0000_0000_0001 recoded by the initial address unit A1 corresponding to the variable Setting 1 first. Then, the memory controller 120 read the content corresponding to the variable from the storage unit B1 corresponding to the storage address 64'h0000_0000_0000_0001.

Figure 3:
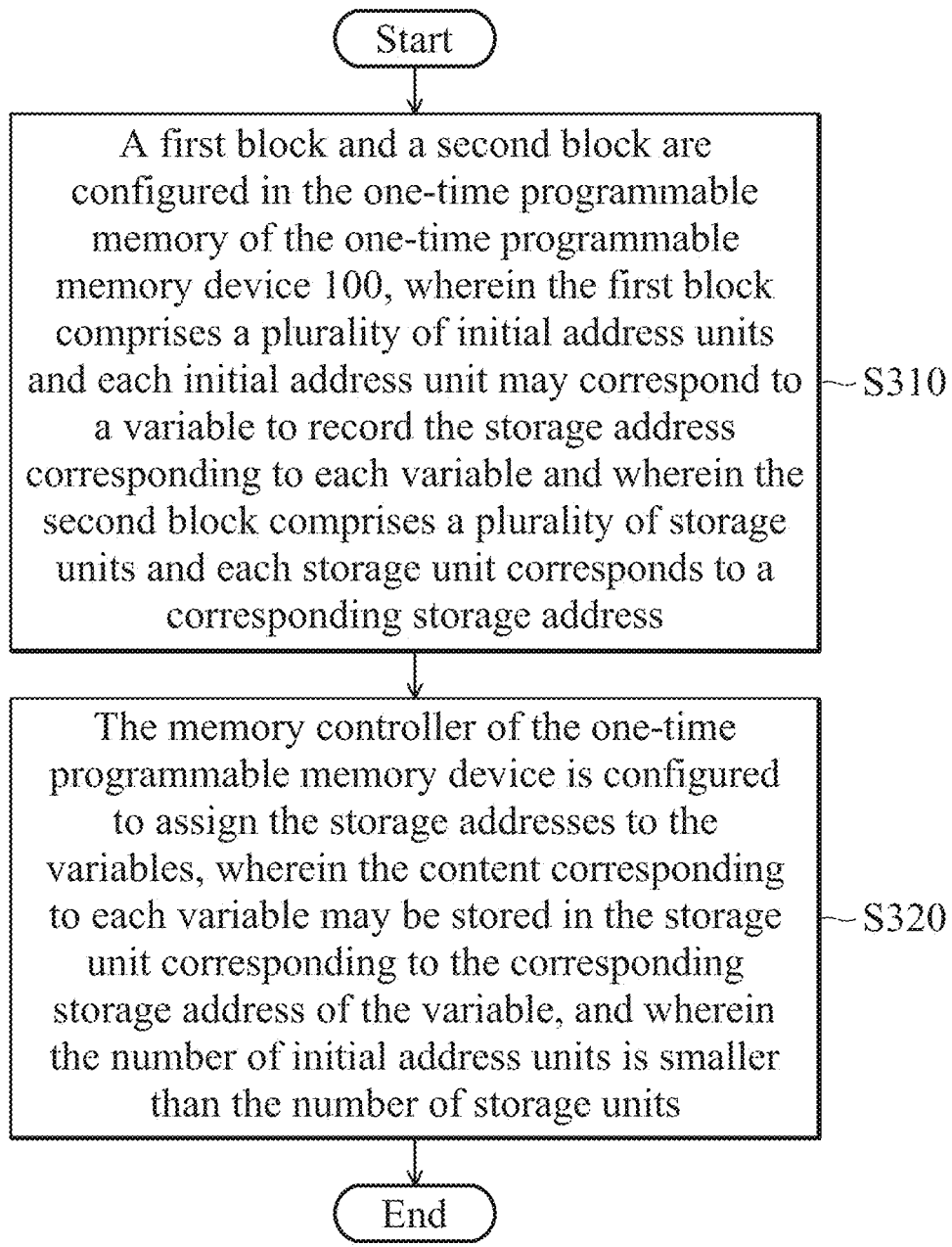
FIG. 3 is a flow chart 300 illustrating a tolerance method for the one-time programmable memory according to an embodiment of the invention.

FIG. 3 is a flow chart 300 illustrating a tolerance method for the one-time programmable memory according to an embodiment of the invention. The tolerance method for the one-time programmable memory can be applied to the one-time programmable memory device 100. In step S310, a first block and a second block are configured in the one-time programmable memory of the one-time programmable memory device 100, wherein the first block comprises a plurality of initial address units and each initial address unit may correspond to a variable to record the storage address corresponding to each variable and wherein the second block comprises a plurality of storage units and each storage unit corresponds to a corresponding storage address. In step S320, the memory controller of the one-time programmable memory device 100 may be configured to assign the storage addresses to the variables, wherein the content corresponding to each variable may be stored in the storage unit corresponding to the corresponding storage address of the variable, and wherein the number of initial address units is smaller than the number of storage units.

According to an embodiment of the invention, the tolerance method for the one-time programmable memory further comprises the steps of configuring a third block in the one-time programmable memory of the one-time programmable memory device 100 to record the number of variables which are programmed into the one-time programmable memory, and configuring a fourth block in the one-time programmable memory of the one-time programmable memory device 100 to record the number of storage addresses.

According to an embodiment of the invention, in the tolerance method for the one-time programmable memory, a one-hot encoding method is adopted to generate the contents stored in the first block, second block, the third block and the fourth block.

According to an embodiment of the invention, in the tolerance method for the one-time programmable memory, each initial memory unit is configured to record the variable number and the variable name of its corresponding variable.

Figure 4:
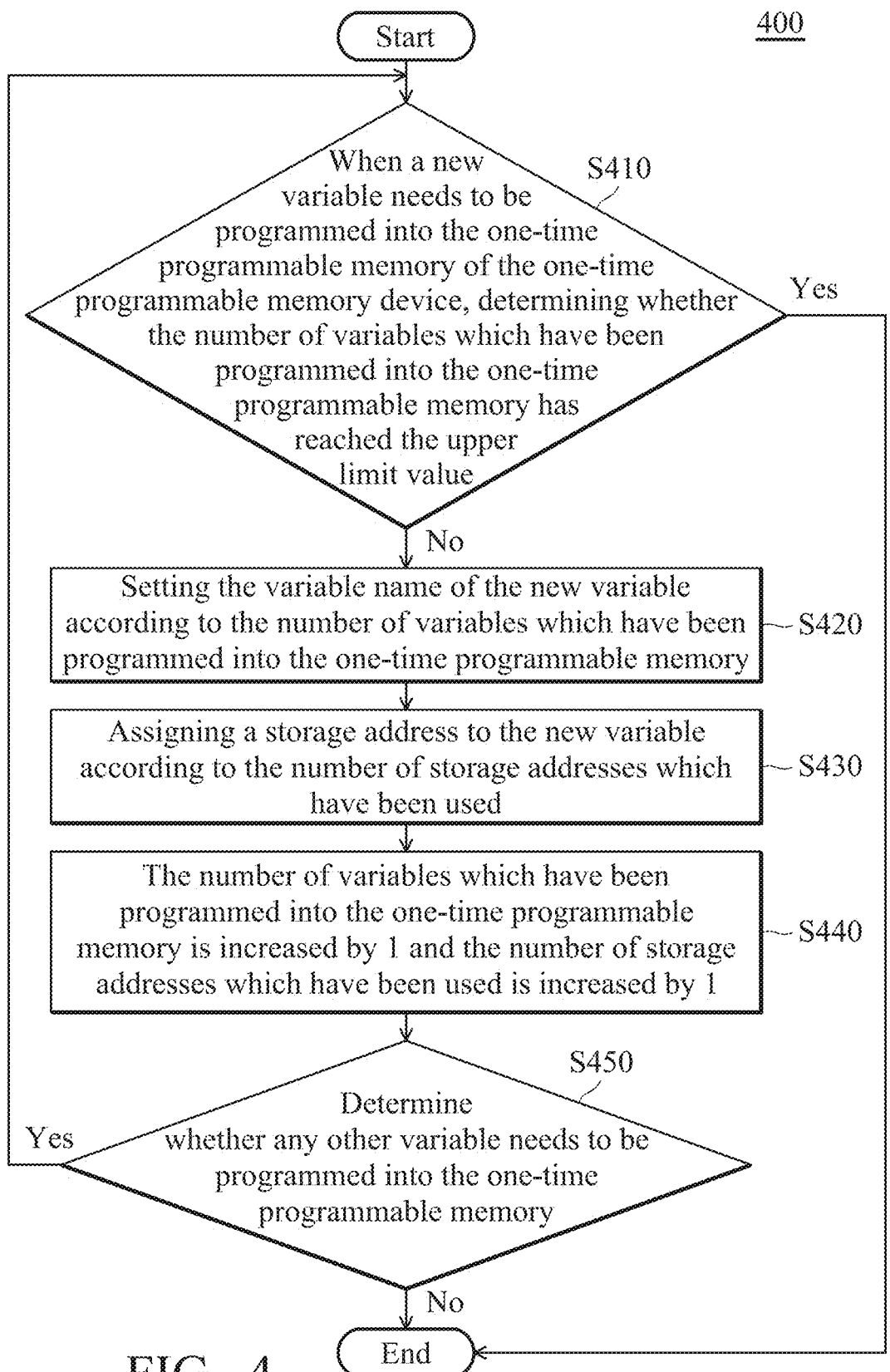
FIG. 4 is a flow chart 400 illustrating of adding new variable in the tolerance method for the one-time programmable memory according to an embodiment of the invention.

FIG. 4 is a flow chart 400 illustrating of adding new variable in the tolerance method for the one-time programmable memory according to an embodiment of the invention. The flow of adding new variable in the tolerance method for the one-time programmable memory can be applied to the one-time programmable memory device 100. In step S410, when a new variable needs to be programmed into the one-time programmable memory of the one-time programmable memory device 100, the memory controller of the one-time programmable memory device 100 may determine whether the number of variables which have been programmed into the one-time programmable memory has reached the upper limit value (i.e. whether the value of MAX_USED_NO has reached the upper limit value). If the number of variables which have been programmed into the one-time programmable memory has reached the upper limit value, the flow ends.

If the number of variables which have been programmed into the one-time programmable memory has not reached the upper limit value, step S420 is performed. In step S420, the memory controller of the one-time programmable memory device 100 sets the variable name of the new variable according to the number of variables which have been programmed into the one-time programmable memory (i.e. the value of MAX_USED_NO). In step S430, the memory controller of the one-time programmable memory device 100 assigns a storage address to the new variable according to the number of storage addresses which have been used (i.e. the value of MAX_USED_ADDR).

In step S440, the number of variables which have been programmed into the one-time programmable memory is increased by 1 (i.e. the value of MAX_USED_NO is increased by 1) and the number of storage addresses which have been used is increased by 1 (i.e. the value of MAX_USED_ADDR is increased by 1) through the memory controller of the one-time programmable memory device 100. In step S450, the memory controller of the one-time programmable memory device 100 is configured to determine whether any other variable needs to be programmed into the one-time programmable memory of the one-time programmable memory device 100. If there is another variable needs to be programmed into the one-time programmable memory of the one-time programmable memory device 100, the flow backs to step S410.

Figure 5:
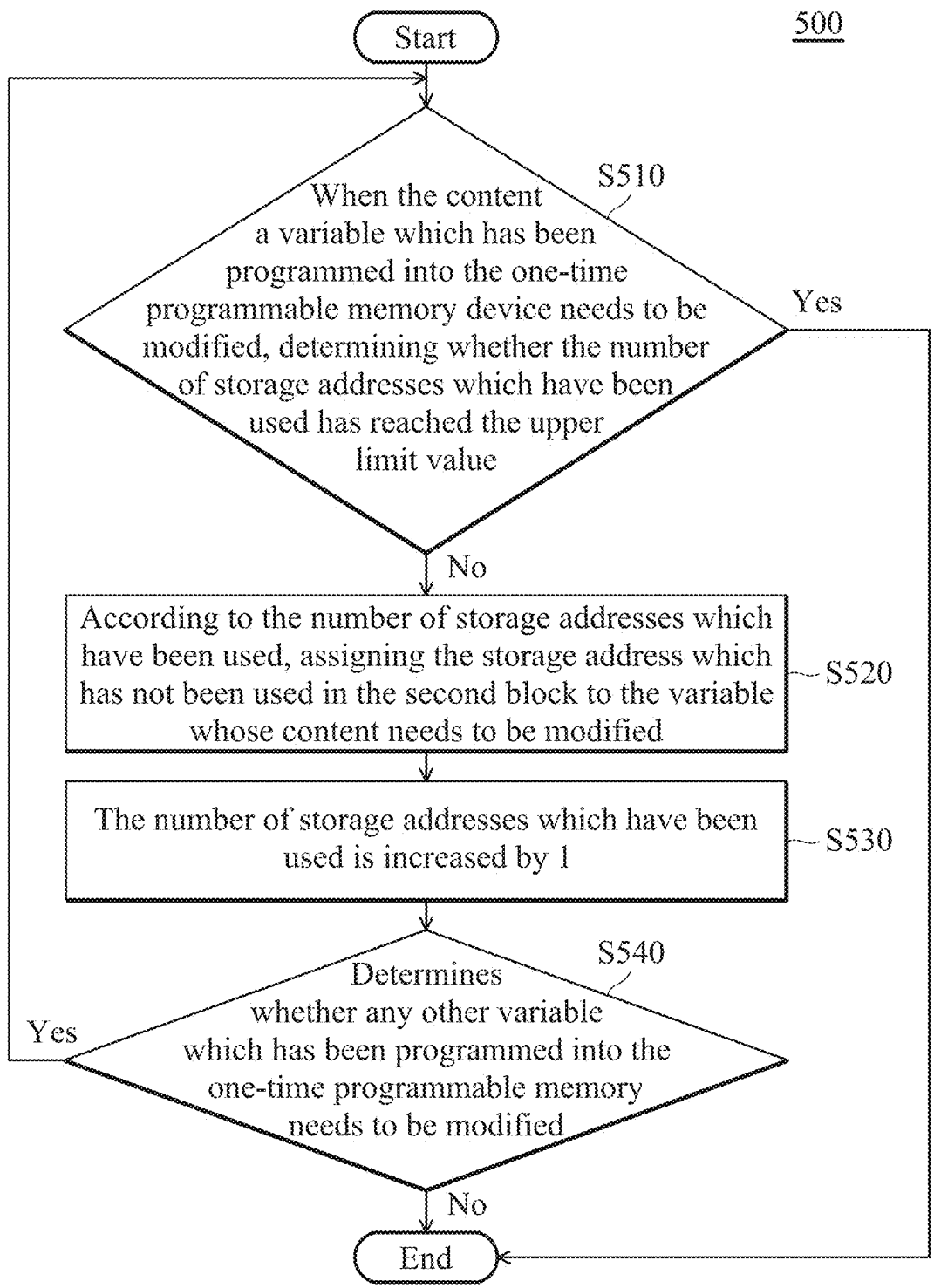
FIG. 5 is a flow chart 500 illustrating of modifying the content of the variable in the tolerance method for the one-time programmable memory according to an embodiment of the invention.

FIG. 5 is a flow chart 500 illustrating of modifying the content of the variable in the tolerance method for the one-time programmable memory according to an embodiment of the invention. The flow of modifying the content of the variable in the tolerance method for the one-time programmable memory can be applied to the one-time programmable memory device 100. In step S510, when the content a variable which has been programmed into the one-time programmable memory device 100 needs to be modified, the memory controller of the one-time programmable memory device 100 determines whether the number of storage addresses which have been used has reached the upper limit value. If the number of storage addresses which have been used has reached the upper limit value, the flow ends.

If the number of storage addresses which have been used has not reached the upper limit value, step S520 is performed. In step S520, according to the number of storage addresses which have been used (i.e. the value of MAX_USED_ADDR), the memory controller of the one-time programmable memory device 100 is configured to assign the storage address which has not been used in the second block to the variable whose content needs to be modified. In step S530, after the content of the variable is modified, the number of storage addresses which have been used is increased by 1 through the memory controller of the one-time programmable memory device 100. In step S540, the memory controller of the one-time programmable memory device 100 determines whether any other variable which has been programmed into the one-time programmable memory needs to be modified. If there is another variable which has been programmed into the one-time programmable memory needs to be modified, the flow backs to S510.

Figure 6:
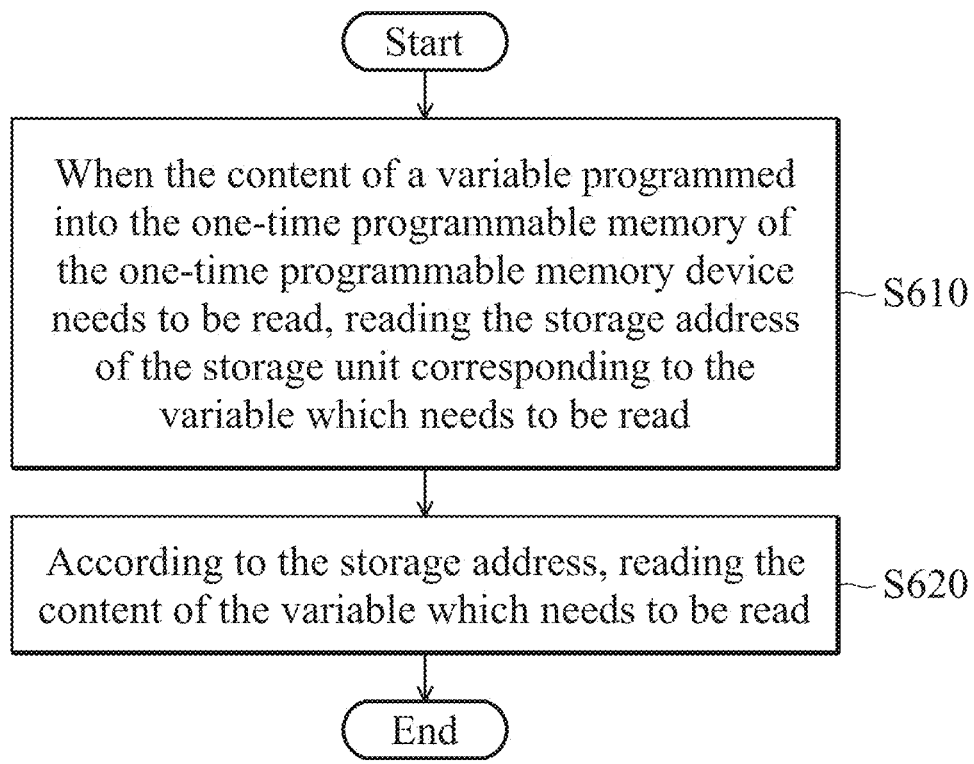
FIG. 6 is a flow chart 600 illustrating of reading the content of the variable in the tolerance method for the one-time programmable memory according to an embodiment of the invention.

FIG. 6 is a flow chart 600 illustrating of reading the content of the variable in the tolerance method for the one-time programmable memory according to an embodiment of the invention. The flow of reading the content of the variable in the tolerance method for the one-time programmable memory can be applied to the one-time programmable memory device 100. In step S610, when the content of a variable programmed into the one-time programmable memory of the one-time programmable memory device 100 needs to be read, the memory controller of the one-time programmable memory device 100 is configured to read the storage address of the storage unit corresponding to the variable which needs to be read. In step S620, according to the storage address, the memory controller of the one-time programmable memory device 100 is configured to read the content of the variable which needs to be read.

According to the tolerance method for the one-time programmable memory provided in the embodiments of the invention, when a variable needs to be modified, other variables do not need to be programmed again. Therefore, the storage space of one-time programmable memory will be saved. In addition, according to the tolerance method for the one-time programmable memory provided in the embodiments of the invention, the user can modify the contents of variables more flexibly.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A one-time programmable memory device, comprising:
   a one-time programmable memory, comprising a first block and a second block, wherein the first block comprises a plurality of initial address units and each initial address unit corresponds to a variable to record a storage address of its corresponding variable, and wherein the second block comprises a plurality of storage units and each storage unit has a corresponding storage address; and a memory controller, coupled to the one-time programmable memory and allocating the storage address to the variable;

wherein content of each variable is stored in the storage unit corresponding to the storage address corresponding to the variable; and wherein the number of the initial address units is smaller than the number of the storage units, wherein when one of the variables needs to be modified, the memory controller determines whether the number of the storage units which have been used has reached an upper limit value.

2. The one-time programmable memory device of claim 1, further comprising:
a third block, configured to record the number of the variables which have been programmed into the one-time programmable memory; and
a fourth block, configured to record the number of the storage units.

3. The one-time programmable memory device of claim 2, wherein contents stored in the first block, the third block and the fourth block are generated through a one-hot encoding method.

4. The one-time programmable memory device of claim 2, wherein when a new variable needs to be added into the one-time programmable memory, the memory controller determines that the number of the variables which have been programmed into the one-time programmable memory has reached an upper limit value.

5. The one-time programmable memory device of claim 4, wherein if the number of the variables which have been programmed into the one-time programmable memory have not reached the upper limit value, the memory controller sets a variable name for the new variable according to the number of the variables which have been programmed into the one-time programmable memory.

6. The one-time programmable memory device of claim 1, wherein if the number of the storage units which have been used have not reached the upper limit value, the memory controller assigns the storage address which has not been used in the second block to the variable which needs to be modified.

7. The one-time programmable memory device of claim 6, wherein when the variable is modified, the memory controller increases the number of the storage units which have been used by 1.

8. The one-time programmable memory device of claim 1, wherein when the content of the variable programmed into the one-time programmable memory needs to be read, the memory controller reads the storage address stored in the initial address unit corresponding to the variable whose content needs to be read, and then obtains the content of the variable according to the storage address.

9. The one-time programmable memory device of claim 1, wherein each initial address unit further records a variable number and a variable name for its corresponding variable.

10. A tolerance method for the one-time programmable memory, comprising:
configuring a first block and a second block in a one-time programmable memory of a one-time programmable memory device, wherein the first block comprises a plurality of initial address units and each initial address unit corresponds to a variable to record a storage address of its corresponding variable, and wherein the second block comprises a plurality of storage units and each storage unit has a corresponding storage address;

allocating, by a memory controller of the one-time programmable memory device, the storage address to the variable; and when one of the variables needs to be modified, determining, by the memory controller, whether the number of the storage units which have been used has reached an upper limit value;

wherein content of each variable is stored in the storage unit corresponding to the storage address corresponding to the variable; and wherein the number of the initial address units is smaller than the number of the storage units.

11. The tolerance method for the one-time programmable memory of claim 10, further comprising:
configuring a third block in the one-time programmable memory to record the number of the variables which have been programmed into the one-time programmable memory; and
configuring a fourth block in the one-time programmable memory to record the number of the storage units.

12. The tolerance method for the one-time programmable memory of claim 11, further comprising:
adopting a one-hot encoding method to generate contents stored in the first block, the third block and the fourth block.

13. The tolerance method for the one-time programmable memory of claim 11, further comprising:
when a new variable needs to be added into the one-time programmable memory, determining that the number of the variables which have been programmed into the one-time programmable memory has reached an upper limit value.

14. The tolerance method for the one-time programmable memory of claim 13, further comprising:
if the number of the variables which have been programmed into the one-time programmable memory have not reached the upper limit value, setting a variable name for the new variable according to the number of the variables which have been programmed into the one-time programmable memory.

15. The tolerance method for the one-time programmable memory of claim 10, further comprising:
if the number of the storage units which have been used have not reached the upper limit value, the memory controller assigns the storage address which has not been used in the second block to the variable which needs to be modified.

16. The tolerance method for the one-time programmable memory of claim 15, further comprising:
when the variable is modified, increasing, by the memory controller, the number of the storage units which have been used by 1.

17. The tolerance method for the one-time programmable memory of claim 10, further comprising:
when the content of the variable programmed into the one-time programmable memory needs to be read, reading the storage address stored in the initial address unit corresponding to the variable whose content needs to be read; and
obtaining the content of the variable according to the storage address.

18. The tolerance method for the one-time programmable memory of claim 10, further comprising:
  recording, by each initial address units, a variable number and a variable name for its corresponding variable.

* * * * *